J. P. THURBER.
BEAN HARVESTER.
APPLICATION FILED SEPT. 2, 1915.

1,195,416.   Patented Aug. 22, 1916.
4 SHEETS—SHEET 1.

Witnesses

Inventor
J. P. Thurber

Attorney

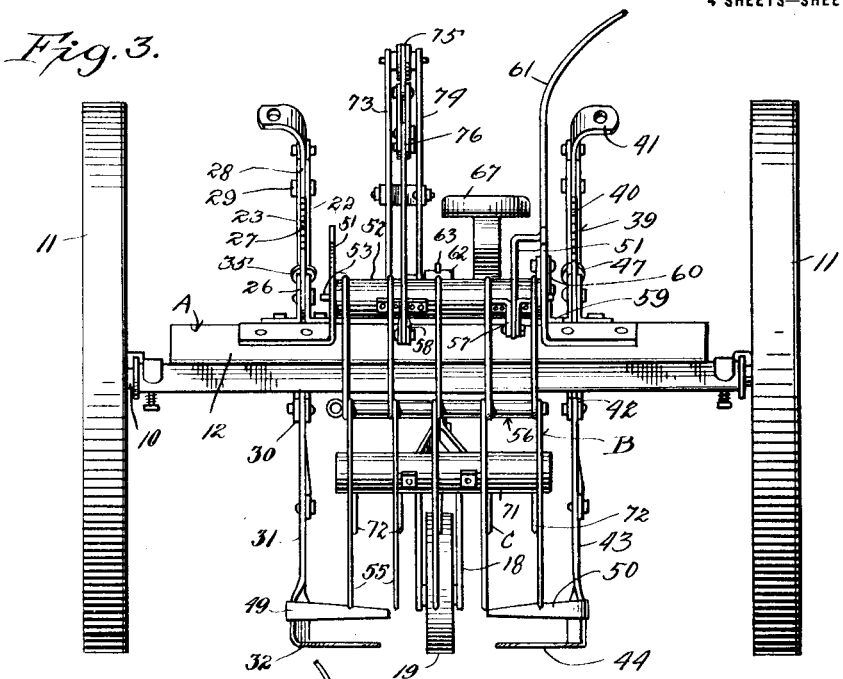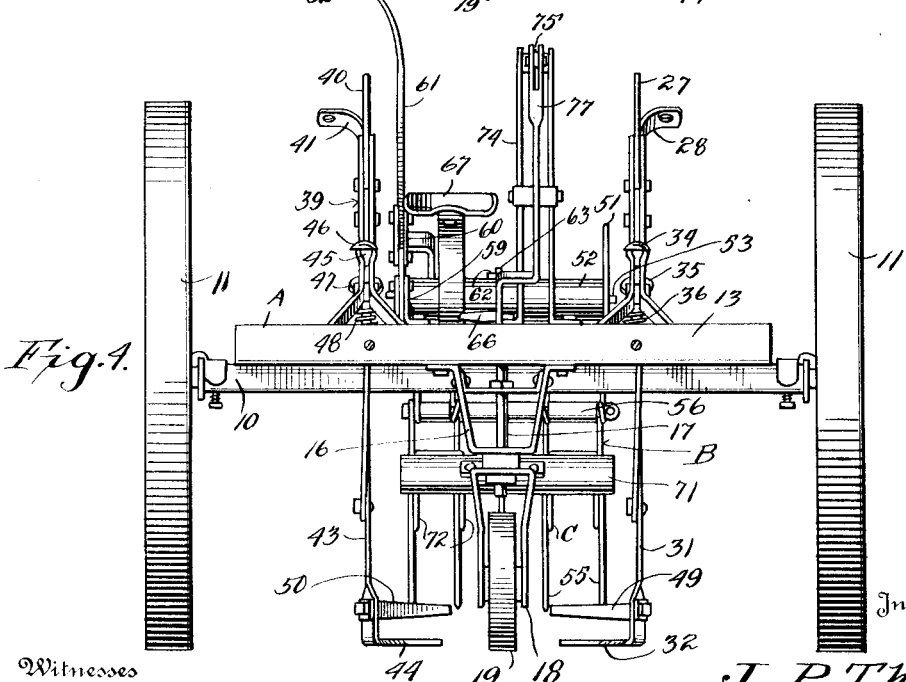

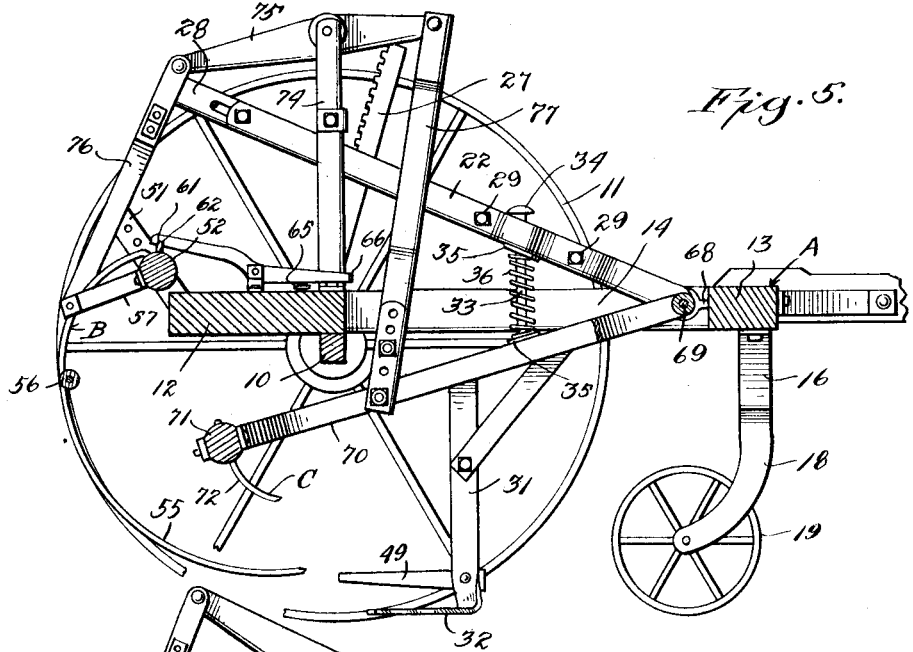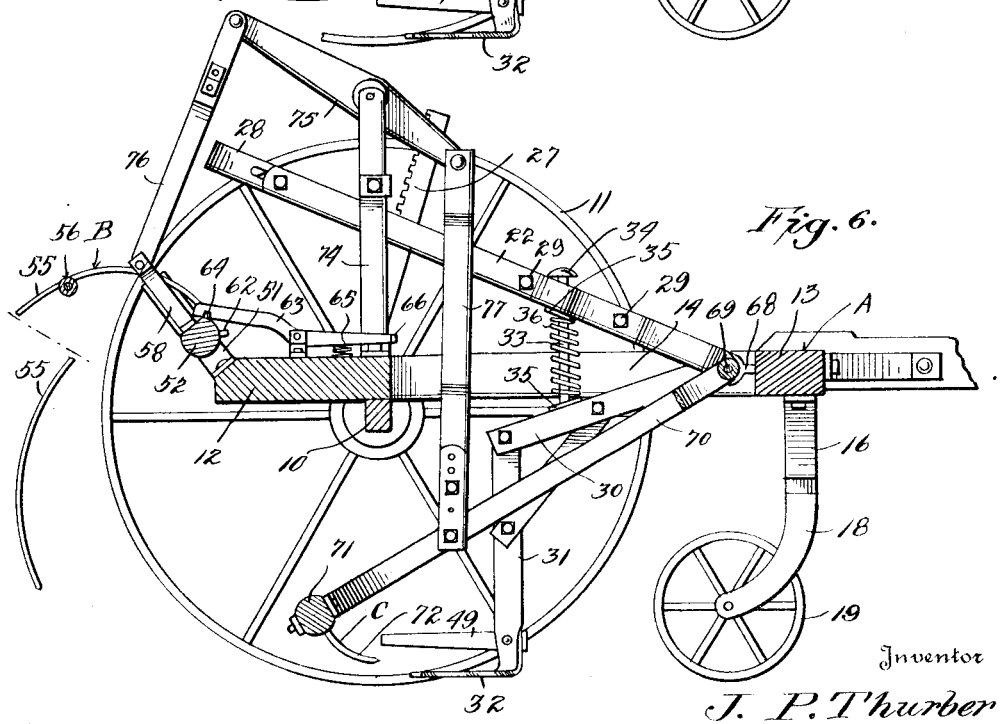

J. P. THURBER.
BEAN HARVESTER.
APPLICATION FILED SEPT. 2, 1915.
1,195,416.
Patented Aug. 22, 1916.
4 SHEETS—SHEET 4.
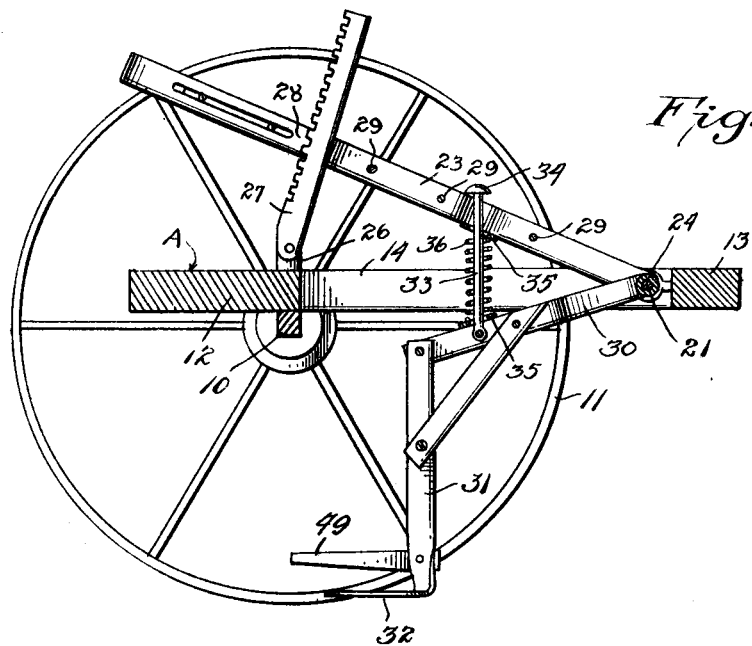
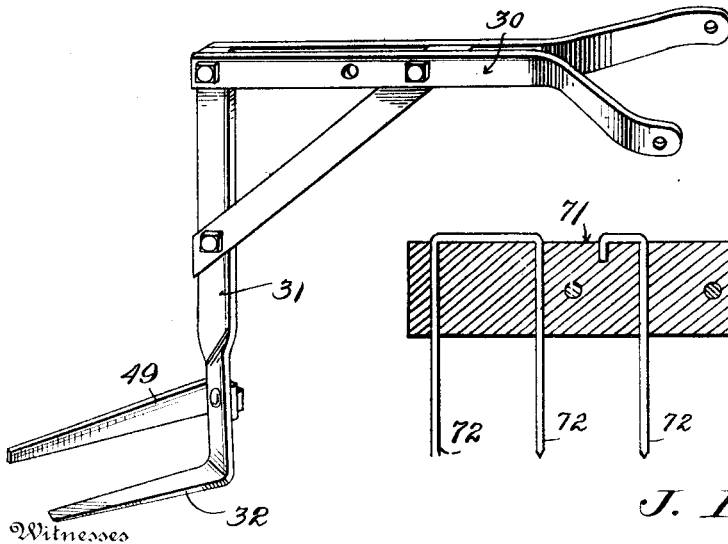
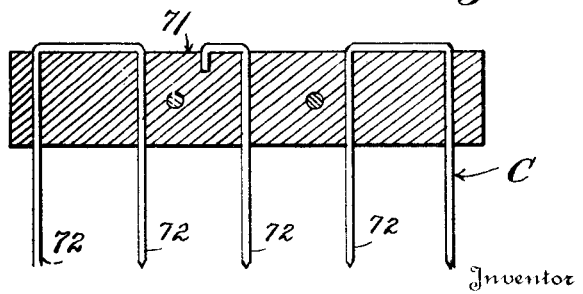
Inventor
J. P. Thurber

UNITED STATES PATENT OFFICE.

JOHN P. THURBER, OF DELRIO, WASHINGTON, ASSIGNOR OF ONE-THIRD TO GEORGE R. WEEKS AND ONE-THIRD TO GEORGE S. BELKNAP, BOTH OF DELRIO, WASHINGTON.

BEAN-HARVESTER.

1,195,416.     Specification of Letters Patent.     Patented Aug. 22, 1916.

Application filed September 2, 1915. Serial No. 48,681.

*To all whom it may concern:*

Be it known that I, JOHN P. THURBER, a citizen of the United States, residing at Delrio, in the county of Douglas, State of Washington, have invented certain new and useful Improvements in Bean-Harvesters; and I do hereby declare the following to be a full, clear, and exact description of the invention, such as will enable others skilled in the art to which it appertains to make and use the same.

This invention relates to bean harvesters.

The object of the invention is to provide a bean harvester which will be simple in construction, efficient in operation and in which various parts are capable of a wide range of adjustment for adapting the machine to different conditions as they may arise.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1:
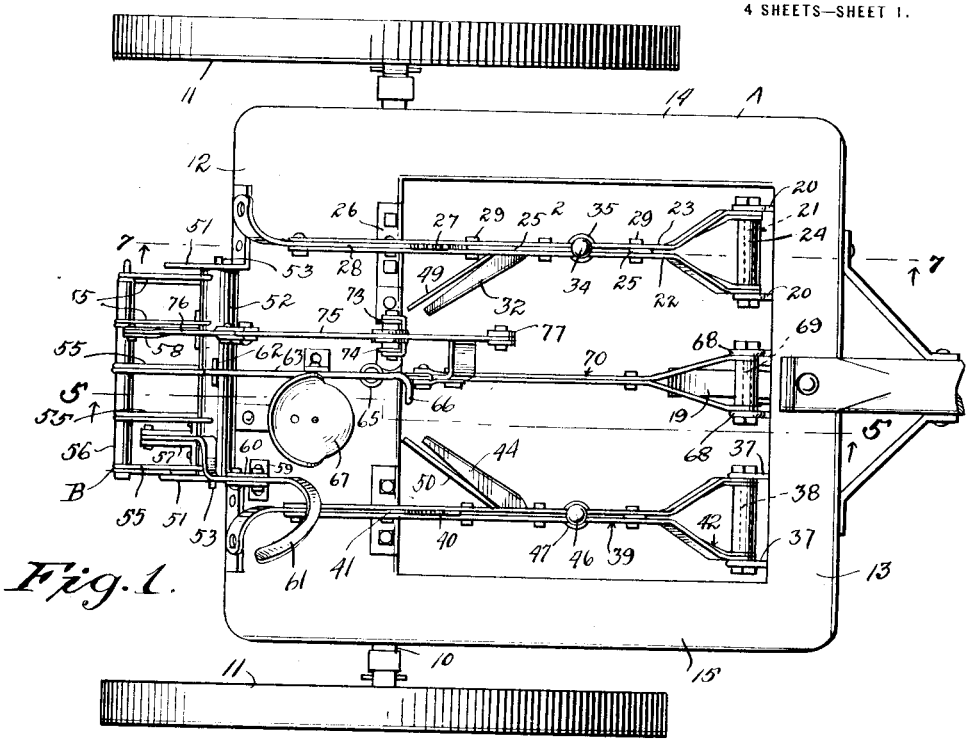
Figure 2:
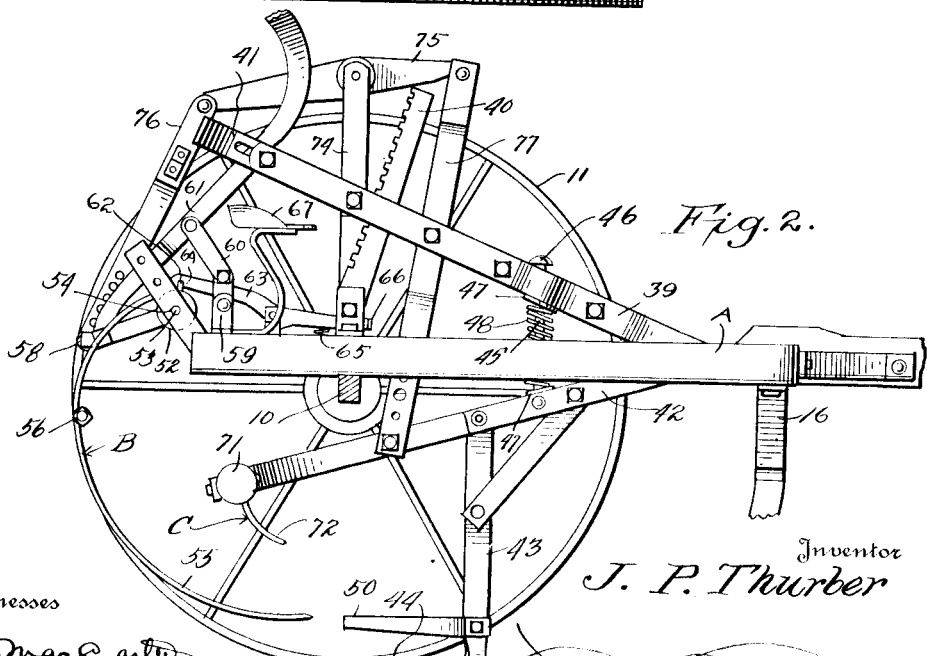

Figure 1 is a plan view of a bean harvester constructed in accordance with the invention; Fig. 2, a side view of same with the near wheel removed; Fig. 3, a rear view of the harvester; Fig. 4, a front view of the harvester; Fig. 5, a section on the line 5—5 of Fig. 1; Fig. 6, a view similar to Fig. 5 with the parts in the position they would occupy when the gathering rake has been raised to its limit; Fig. 7, a section on the line 7—7 of Fig. 1; Fig. 8, a perspective view of one of the cutters and its supporting arm, and Fig. 9, a section through the head of the discharge rake.

Referring to the drawings the improved bean harvester is shown as comprising an axle 10 on the ends of which are rotatably mounted traction wheels 11. Mounted upon the axle 10 is a frame A which includes a rear member 12, a front member 13 and side members 14 and 15. Depending from the front member 13 is a bracket 16 in which is rotatably mounted the stem 17 of a frame 18 and rotatable in this frame is a ground wheel 19 which supports the forward end of the frame A. Secured to the inner side of the front member 13 are spaced brackets 20, said brackets being disposed adjacent the side member 14 and supporting a shaft 21. Pivoted upon the shaft 21 are bars 22 and 23 which have the ends thereof engaged on the shaft held in spaced relation by a sleeve 24. The bars 22 and 23 at a point adjacent the shaft 21 are bent toward each other and are then carried rearwardly of the machine in parallel relation, said bars being held slightly spaced by blocks 25. Mounted on the rear member 12 is a bracket 26 and pivoted to this bracket is a rack bar 27 slidably engaged between the bars 22 and 23. Slidably mounted between the bars 22 and 23 is a pawl 28 adapted to engage with the teeth of the rack bar 27 to hold the bars 22 and 23 in a desired relation to the rack bar 27. It will be noted that the bars 22 and 23 are connected by bolts 29 and that said bars in their united form constitute a pivoted lever. Also pivoted on the shaft 21 is an arm 30 from the free end of which depends another arm 31. The lower end of this arm 31 is bent laterally toward and inclined rearwardly with respect to the longitudinal axis of the machine as at 32. This laterally bent portion 32 is sharpened so as to constitute a knife for severing the bean vines. The arm 30 carries a short rod 33 which is slidably engaged between the bars 22 and 23 and is provided with a head 34 disposed above the lever formed by the bars 22 and 23. Engaged on the rod 33 and the arm 30 are washers 35 and encircling the rod between these washers is a spring 36.

By this construction it will be obvious that when the knife formed by the lateral extension 32 strikes a rigid obstacle the spring 36 will give and prevent injury to the knife even though the lever formed by the bars 22 and 23 is locked against movement. Also mounted on the inner side of the front member 13 are brackets 37 carrying a shaft 38. Pivoted on this shaft is a lever 39 constructed in a manner similar to the lever formed by the bars 22 and 23, a rack bar 40 is slidably engaged with the lever 39 and pivotally mounted on the rear member 12 and this lever 39 carries a pawl 41 coöperating with the rack 40 said pawl being constructed and mounted in a manner similar to the pawl 28. Also pivoted on the shaft 38 is an arm 42 from the free end of which depends an arm 43. The lower end of this arm terminates in an inwardly and rearwardly directed knife 44 similar to the knife formed by the laterally bent portion 32 of the arm 31. Carried by the arm 42 is a rod 45 slidably engaged with the lever 39 and provided with a head 46 disposed above the lever. Mounted on the rod 45 are washers 47 and encircling said rod between the washers 47 is a spring 48 which is adapted to yield when the knife 44 strikes a rigid object and thus protects said knife from injury.

Secured to the arms 31 and 43 respectively are fingers 49 and 50 which extend in the same general direction as do the knives 32 and 44 a slight distance above the latter and serve to move the material cut by the knives toward the center of the machine. By adjusting the levers it will be obvious that the positions of the knives 32 and 44 relative to the ground can be varied to suit conditions. Secured to the rear member 12 are spaced brackets 51 between which is pivotally mounted a rake B. This rake B includes a head 52 having trunnions 53 adapted to be interchangeably and rotatably engaged in corresponding openings 54 formed in the brackets 51 for the purpose of varying the lift of the rake. The rake B further comprises a plurality of curved teeth 55 which are strengthened by a transverse brace member 56. Carried by the head 52 are arms 57 and 58 for a purpose that will presently appear.

Mounted on the rear member 12 is a bracket 59 to which is pivoted one end of a link 60. Pivoted to the other end of this link is a lever 61 which has one end thereof pivotally connected to the arm 57. By this construction it will be apparent that when the lever 61 is rocked in one direction the free end of the rake B will be elevated, while opposite movement of the lever will permit the free end of the rake to lower.

In order to lock the rake B against pivotal movement there is provided on the head 52 a lug 62 while a lever 63 is pivoted on the rear member 12. One end of this lever 63 is provided with a recess 64 adapted to receive the lug 62. A spring 65 coöperates with the lever 63 to yieldingly hold the lever 63 in interlocking relation with the lug 62. The forward end of the lever 63 is bent laterally to form a foot pedal 66 whereby said lever may be rocked against the influence of the spring 65 to disengage the lug 62 from the recess 64 to permit pivotal movement of the rake B. A seat 67 is mounted upon the rear member 12 in position to permit convenient operation of the lever 63 with the foot.

Mounted on the inner side of the front member 13 between the brackets 20 and 51 are brackets 68 carrying a shaft 69 upon which is pivotally mounted an arm 70. Secured to the free end of this arm is the head 71 of a discharging rake C. This head also carries a plurality of relatively short teeth 72. Mounted upon the rear member 12 are upstanding arms 73 and 74 between which is pivoted a lever 75. One end of the lever 75 is connected by a link 76 with the arm 58, while the other end of said lever is connected by a link 77 with the arm 70. By this construction it will be obvious that when the rake B is elevated the rake C will be moved downwardly and operate to strip the material from the rake B and thus aid in the efficient discharge of material from the latter.

Assuming the parts to be in the position shown in Fig. 5 it will be obvious that the material cut by the knives 32 and 44 will be forced toward the center of the machine by the arms 49 and 50 and gathered by the rake 55. The lever 61 is then operated to move the parts to the position shown in Fig. 6 when the material on the rake teeth 55 will be discharged and the rake C will be moved to a position immediately in the rear of the knives 32 and 44 so as to gather the material as the rake B is discharging and thus prevent such material from being scattered thinly over the ground. The lever 61 is then again operated to return the parts to the position shown in Fig. 5. This process is continued during the use of the machine.

What is claimed is:—

1. In a bean harvesting machine, the combination with a wheeled frame, a cutting device depending from the frame, a rake pivotally mounted on the frame at the rear of the cutting device, a second rake pivotally mounted on the frame and disposed between the first rake and the cutting device, and means operable to simultaneously pivot said rakes in opposite directions.

2. In a bean harvesting machine, the combination with a wheeled frame, a cutting device depending from the frame, a rake pivotally mounted on the frame at the rear of the cutting device, a second rake pivotally mounted on the frame and disposed between the first rake and the cutting device, a bracket on the frame, a two arm lever pivoted on the bracket, connections between the ends of said lever and respective rakes whereby the rocking of the lever will pivot said rakes in opposite directions, and means for pivoting the first named rake.

In testimony whereof, I affix my signature, in the presence of two witnesses.

JOHN P. THURBER.

Witnesses:
BEN G. WEEKS,
GEO. S. BELKNAP.